United States Patent
Ernst et al.

(10) Patent No.: US 8,215,831 B2
(45) Date of Patent: Jul. 10, 2012

(54) SENSOR ELEMENT

(75) Inventors: Henrik Ernst, Katzenelnbogen (DE); Hermann Karagözoglu, Wiesbaden (DE); Martin Hausner, Wiesbaden (DE); Guido Lauck, Flörsheim (DE); Jürgen Schilz, Niedernhausen (DE)

(73) Assignee: Excelitas Technologies GmbH & Co. KG, Wiesbaden (DE)

( * ) Notice: Subject to any disclaimer, the term of this patent is extended or adjusted under 35 U.S.C. 154(b) by 403 days.

(21) Appl. No.: 11/570,305

(22) PCT Filed: Jun. 8, 2005

(86) PCT No.: PCT/EP2005/006159
§ 371 (c)(1),
(2), (4) Date: Sep. 12, 2007

(87) PCT Pub. No.: WO2005/121728
PCT Pub. Date: Dec. 22, 2005

(65) Prior Publication Data
US 2007/0297485 A1 Dec. 27, 2007

(30) Foreign Application Priority Data
Jun. 9, 2004 (DE) .......... 10 2004 028 032

(51) Int. Cl.
*G01J 5/12* (2006.01)
*G01K 7/02* (2006.01)
(52) U.S. Cl. .............. 374/121; 374/179; 250/338.1
(58) Field of Classification Search ............. 374/120, 374/121, 179, 124, 43–45, 100, 29, 30, 110, 374/112, 115, 113, 166, 167, 134, 137; 250/338.1
See application file for complete search history.

(56) References Cited

U.S. PATENT DOCUMENTS

| | | | |
|---|---|---|---|
| 3,758,830 A * | 9/1973 | Jackson .......... | 257/419 |
| 5,626,139 A | 5/1997 | Szeles et al. | |
| 5,921,680 A | 7/1999 | Pleva et al. | |
| 5,962,854 A * | 10/1999 | Endo .............. | 250/349 |
| 6,043,493 A * | 3/2000 | Kim et al. ....... | 250/349 |
| 6,203,194 B1 * | 3/2001 | Beerwerth et al. | 374/133 |
| 6,238,085 B1 * | 5/2001 | Higashi et al. .... | 374/10 |
| 6,339,220 B1 * | 1/2002 | Oda .............. | 250/338.1 |
| 6,372,656 B1 * | 4/2002 | Laermer et al. .... | 438/719 |

(Continued)

FOREIGN PATENT DOCUMENTS

DE  39 25 391 A1  2/1991

(Continued)

OTHER PUBLICATIONS

PCT International Search Report, English Version, Dated Mar. 1, 2007.

(Continued)

*Primary Examiner* — Gail Verbitsky
(74) *Attorney, Agent, or Firm* — Peter A. Nieves; Sheehan Phinney Bass + Green PA

(57) ABSTRACT

A sensor element for detecting electromagnetic radiation, particularly in the infrared range, comprises one or more heat-sensitive portions provided on a substrate and one or more influencing layers for influencing the absorption and/or reflection of the electromagnetic radiation to be detected. The heat-sensitive portion(s) and/or the influencing layers are arranged on the substrate in accordance with the thermal properties of the influencing layers, preferably asymmetrically.

5 Claims, 2 Drawing Sheets

U.S. PATENT DOCUMENTS

| | | | | |
|---|---|---|---|---|
| 6,551,853 B2 * | 4/2003 | Toyoda | | 438/90 |
| 6,949,286 B2 * | 9/2005 | Nakajima et al. | | 428/331 |
| 7,005,643 B2 * | 2/2006 | Hamamoto | | 250/338.1 |
| 7,208,736 B2 * | 4/2007 | Watanabe | | 250/338.1 |
| 2002/0069909 A1 * | 6/2002 | Kubo | | 136/224 |
| 2003/0133489 A1 * | 7/2003 | Hirota et al. | | 374/121 |
| 2003/0205670 A1 * | 11/2003 | Shibayama | | 250/338.4 |
| 2003/0222218 A1 * | 12/2003 | Nozu | | 250/338.1 |
| 2004/0188618 A1 * | 9/2004 | Hamamoto | | 250/338.1 |
| 2005/0109103 A1 * | 5/2005 | Zimmermann et al. | | 73/295 |
| 2006/0006333 A1 * | 1/2006 | Hirota | | 250/338.1 |
| 2006/0179940 A1 * | 8/2006 | Liu et al. | | 73/488 |

FOREIGN PATENT DOCUMENTS

| | | | |
|---|---|---|---|
| DE | 44 41 257 A1 | | 5/1996 |
| DE | 197 10 946 A1 | | 9/1998 |
| DE | 100 57 40 C2 | | 5/2001 |
| JP | 57100325 A | * | 6/1982 |
| JP | 02165025 A | * | 6/1990 |
| JP | 03125935 A | * | 5/1991 |
| JP | 03221822 A | * | 9/1991 |
| JP | 03291541 A | * | 12/1991 |
| JP | 2010164462 A | * | 7/2010 |
| RU | 2217712 C2 | * | 11/2003 |
| WO | 91/03204 | | 3/1991 |
| WO | 00/74150 A1 | | 12/2000 |

OTHER PUBLICATIONS

Liu Yueying et al.; "The design of adding heat reflective emitter coatings on the cold region of infrared thermopiles" Thermoelectrics 2002, Proceedings of ICT '02, Aug. 25-29, 2002, pp. 458-462.

European Patent Office, International Search Report, Application No. PCT/EP2005/006159, Dec. 15, 2005.

European Patent Office, International Preliminary Examination Report, Application No. PCT/EP2005/006159, Sep. 21, 2006.

* cited by examiner

SENSOR ELEMENT

The invention relates to a sensor element according to the preambles of the independent claims. It particularly relates to infrared detectors having enhanced properties in case of fluctuations of the ambient temperature. Such sensor elements and sensors are known from the DE 197 10 946 and from the EP 1 039 280.

The invention particularly relates to radiation sensors and here preferably radiation sensors designed to measure temperatures by means of an infrared radiation measurement. The actual sensor elements are, in this case, those structures onto which, concretely, the infrared radiation to be measured is incident and which translate it into electrically usable signals, for example a current, a voltage, an electric charge, in a certain manner. They may be thermopiles or pyrodetectors or bolometers.

Particularly thermopiles have the property that their electrical output signal does not only depend on the incident electromagnetic radiation (in the infrared range) but also on the ambient temperature of the environment in which the sensor element works. To disconnect the sensor elements of heat sinks and of the ambient temperature as much as possible thermopiles are arranged on thermally poorly conducting structures as shown, for example, in FIG. 1. The actual sensor element is denoted by the numerals 4 (4a, 4b). It has a hot end 4a and a cold end 4b. Above the hot end 4a an absorption layer 5a may be provided which may, for example, be of a dark colour so that it absorbs the incident infrared radiation (denoted by IR(To)) particularly well and therefore leads to the heating of the hot end 4a. On the other hand, a reflective layer 5b may be disposed above the cold end 4b, said reflective layer 5b reflecting the incident infrared radiation so that the cold end 4b heats up correspondingly less. The temperature difference between the cold and the hot end results in a measurable voltage difference. A plurality of said structures may be connected in series so that a correspondingly higher signal voltage is obtained.

The sensor elements are disposed on a thin membrane 3 which itself is supported by a substrate 1 formed as a frame. The hot ends 4a are, in this case, regularly not disposed above the frame 1 but on the membrane 3 above the orifice 2 of the frame 1. In this way the hot end 4a is thermally separated from the thermal mass of the Frame 1 so that the impinging infrared radiation can cause a comparably intense heating and thus a strong signal.

If it may be assumed that the ambient temperature (denoted by the arrows Tu beneath the frame 1 of the sensor element) is constant it is desirable that the cold contacts 4b are provided above the frame 1 and, in as far as it is present there, on the membrane 3. Then the heating of the cold contacts by the impinging infrared radiation is low since the cold contacts are coupled to the thermal mass of the frame 1.

If, on the other hand, it has to be assumed that the ambient temperature may change rapidly the cold contacts as well as the hot contact are preferably not provided above the frame 1 but—as shown in FIG. 1—above the orifice 2 in the frame so that also in so far a disconnection of the cold contacts from the changing ambient temperature is effected. A typical field of application for sensor elements or sensors in changing ambient temperatures is the field of indirect temperature measurements through the infrared radiation of the object to be measured, e.g. in air conditioning.

When the temperature conditions of the cold contact are undefined or change this affects the (indirect) temperature measurement through the (direct) measurement of the infrared radiation carried out in accordance with an object temperature To. In some temperature sensor applications, for example, the cold contact is therefore provided above the orifice 2 on the membrane 3.

For an exact temperature measurement the dynamic properties of the temperature distribution are relevant. To this end the DE 197 10 946 suggests to configure the heat capacities of the cold spots and the hot spots as well as the heat conductivity in the vicinity of the cold spots and the hot spots in a certain way to be described in more detail. An asymmetric arrangement of the hot spots of the thermopile sensor with respect to the housing is suggested to realise an irradiation of only the hot spots. With the measures known from the cited document it is intended to cause the influence of the ambient temperature conditions on the cold spots to be identical to their influence on the hot spots.

It is the object of the invention to provide a sensor element and a sensor which are comparatively insusceptible to changes of the ambient temperature of the sensor or sensor element and generally to interfering signal sources.

Said object is solved by the features of the independent claims. The dependant claims relate to preferred embodiments of the invention.

A sensor element according to the invention, preferably a thermopile, serves to detect electromagnetic radiation, particularly in the infrared range ($\lambda > 800$ nm, preferably $>2$ µm, more preferably $>25$ µm) and has one or more heat-sensitive sections disposed on a substrate. In addition influencing layers are provided to influence the absorption and/or reflection of the electromagnetic radiation in and in the vicinity of the heat-sensitive sections. The arrangement of the heat-sensitive sections on the substrate is also determined in accordance with the thermal properties of one or more of the influencing layers. The observed thermal properties of the influencing layers may be heat conductivity, heat capacity, radiation absorbency, radiation reflectivity and radiation emissivity.

In as far as the heat-sensitive sections absorb radiation and thus heat up they may be regarded as heat-sensitive sections. Sections which convert radiation, particularly infrared radiation, into an electric characteristic directly and without a thermal effect may be regarded as an equivalent to the heat-sensitive sections.

In a sensor element according to the invention the heat-sensitive sections of the sensor element, particularly the hot spots and/or cold spots of a thermopile structure, may be arranged on the substrate so as to e symmetric with respect to an axis of symmetry or a point of symmetry of the sensor element and particularly the substrate or a portion of the same, for example the frame or the membrane. In this case the dissymmetry of the arrangement is intended to balance asymmetrical thermal properties wherein the properties of the influencing layers may also be taken into consideration as mentioned above.

A sensor element according to the invention may be configured as described above. Anyway, it comprises heat-sensitive sections and influencing layers for influencing the absorption and/or reflection of the electromagnetic radiation to be detected. The arrangement, design and thickness of the influencing layers may be determined in accordance with the thermal properties of the sensor element or of its components (such as the substrate, the frame, the membrane, the heat-sensitive sections).

A sensor element according to the invention may be configured as described above. It is intended to detect electromagnetic radiation, particularly in the infrared range, and comprises one or more regions provided on a substrate which serve to generate an electric output signal in accordance with the electromagnetic radiation to be detected and one or more second regions which are less sensitive to the electromagnetic radiation to be detected than the first region(s), their electrical output signal being combined with that of the first region(s). Preferably the second regions provide no heat-dependent signal but only a signal corresponding to the ambient temperature which may, at least qualitatively or in sections, proceed like the temperature-dependent signal component from the first regions. The signals from the first and second regions may be switched in phase opposition so that a signal total is obtained from which the temperature variation was at least partly subtracted while the temperature variation of the signal is maintained. In this way the temperature variation may be analogously electrically compensated directly on the sensor element.

On the application date of the present application the same applicant filed a further application with the title "Sensor" the contents of which are referred to herewith to the full extent. The official file number of the cited application is DE 10 2004 028032.0. The features described therein can be combined with the invention described herein and the possible combinations are to be understood as part of the invention described in the present application.

Individual embodiments of the invention are described below with reference to the appended drawings in which.

Figure 1:
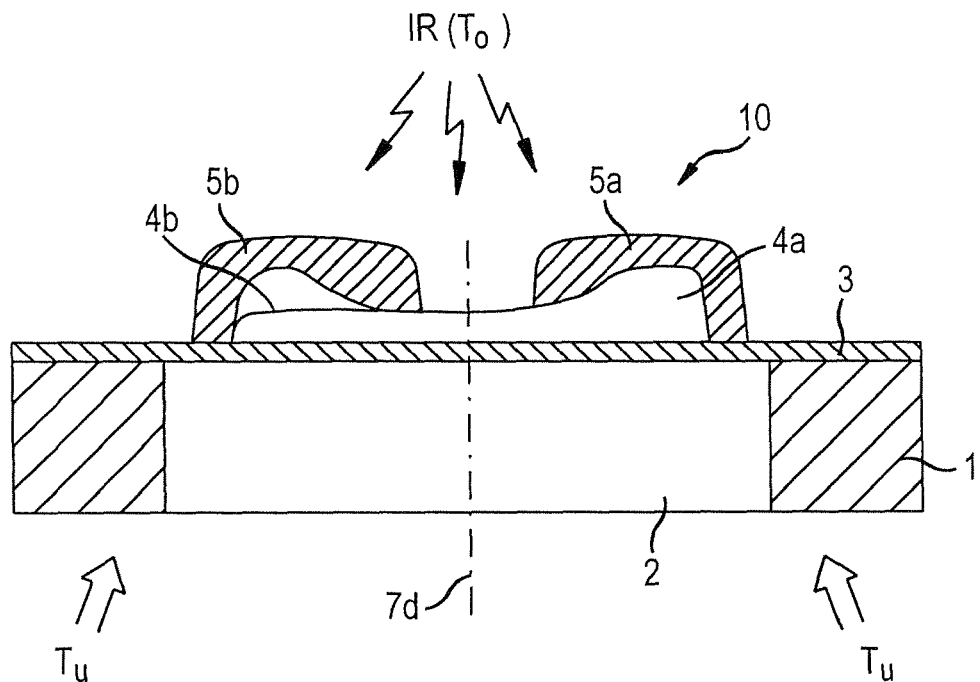
FIG. 1 shows a cross sectional view of a sensor element.

FIG. 1 shows a sensor element to which the invention may be applied. The sensor element 10 is provided with a thermopile which may comprise a series connection of a plurality of cold and hot contacts. The cold contacts are denoted by $4b$, the hot contacts by $4b$. An absorption layer $5a$ may be provided above the hot contacts $4a$, and a reflective layer $5b$ may be provided above the cold contacts $4b$. The absorption layer $5a$ causes an absorption of infrared radiation IR(To) which is generated and emitted in accordance with the object temperature To of the object. The reflective layer $5b$ reflects the radiation. In this manner heating due to the incident radiation is promoted at the hot end $4a$ while it is suppressed at the cold end. The warm as well as the cold end are provided above the orifice 2 of the frame 1 on a membrane 3 covering the orifice 2. The cross dimension of the sensor element shown in FIG. 1 may be a few millimeters. The height of the frame may be some hundred micrometers. At first individual sensor elements are described in general.

The invention may, however, also be applied to multi-element sensors, i.e. to sensors comprising a plurality of sensor elements and disposed in close vicinity to each other to obtain a spatial resolution in connection with a projection element. The orifices 2 of the frame 1 are usually rectilinearly terminated (please refer to the plan view of FIG. 2, lower right corner). The orifice 2 may be rectangular or square. However, circular or oval orifices may also be a subject matter of the invention. The axis of symmetry of the sensor element is denoted by $7d$. It may be the axis of symmetry of the orifice 2. The symmetry may be a rotational symmetry (for example every 90°) or a mirror symmetry (left/right).

Figure 2:
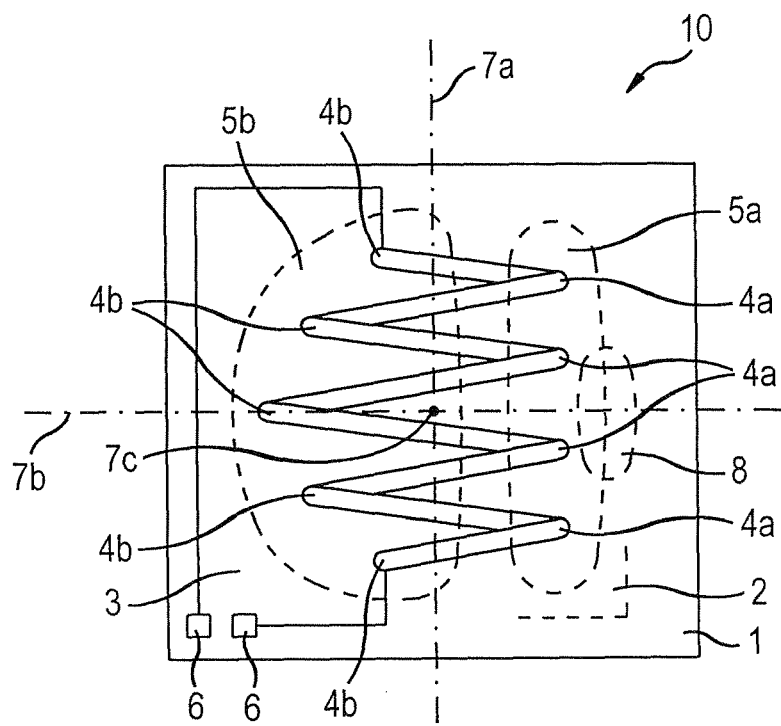
FIG. 2 is a plan view of a sensor element according to the invention.

FIG. 2 shows the arrangement of the cold and hot contact points of a thermopile or, in general, of the heat-sensitive portions $4a$, $4b$ of the sensor element. It can be seen that they are not formed symmetrically with respect to the axes of symmetry $7a$, $7b$ or the points of symmetry $7c$. Said asymmetric arrangement is intended to balance asymmetrical thermal properties of the sensor element in general and particularly the influencing layers $5a$, $5b$, in this case particularly the heat conductivity. The reflective layer $5b$ may be a thin aluminium layer which, however, has a comparatively high thermal conductivity so that thermal "shocks" due to a changing ambient temperature "arrive" at the cold contacts relatively fast.

In contrast the absorption layer $5a$ has a comparatively low heat conductivity so that temperature changes due to a changing ambient temperature arrive at the hot contacts relatively slowly. This dissymmetry which has an effect in case of a dynamic temperature variation of the ambient temperature may be balanced by an asymmetric arrangement of the cold or hot contacts. According to FIG. 2a, for example, the cold contacts $4b$ under the reflective layer $5b$ are not disposed in the same distance to the frame 1 as the hot contacts $4a$. Generally speaking the cold contacts may be provided on the membrane 3 in a larger mean distance to the frame 1 than the hot contacts $4a$. The better heat conductivity of the reflective layer is compensated by the larger distance to the frame 1 supplying the ambient temperature.

In other words the heat-sensitive portions are arranged on the substrate in accordance with the thermal properties of the sensor element, particularly its dynamic thermal properties and particularly of the frame and/or the membrane and/or the influencing layers and/or the heat-sensitive portions themselves. The examined thermal properties may be heat conductivity, heat capacity, radiation absorbency, radiation reflectivity, radiation emissivity. In particular the heat conductivity and the heat capacity of the influencing layers are taken into consideration.

As to the result this may lead to the mean distance between the heat-sensitive portions under the reflective layers and the frame being larger than the mean distance between the heat sensitive portions under the absorption layers and the frame 1.

The arrangement of the heat-sensitive portions may be so that they are disposed on isotherms which appear during dynamic processes. The isotherms may, for example, be determined by a numerical simulation (such as a finite element method). The individual heat-sensitive portions may then be positioned on said isotherms. In consequence the hot as well as the cold contacts go through an approximately identical temperature development in case of rapid changes of the ambient temperature. Here the term "rapid" means that the temperature change happens faster than the amount of heat can be removed due to the thermal time constant of the sensor element. This, however, may absolutely lead to signal changes in the useful signal. But anyway the individual heat sensitive portions are subjected to the "thermal shock" simultaneously so that the influence of the dynamic effects is not smeared over a longer period of time put occurs within a short period of time and than fades soon again.

To balance thermal dissymmetries as mentioned above the positioning and dimensioning of the influencing surfaces themselves may be determined instead of or in addition to the selection of the positions of the heat-sensitive surfaces. To suppress the heat conductivity in the influencing surfaces they may be provided with heat conduction barriers, for example in the shape of slit-shaped interruptions which preferably extend approximately rectangular (>60°) to the temperature gradient.

In addition influencing surface geometries may be provided which balance the thermal dissymmetries described above. It may, for example, be intended to move one reflective layer to the close vicinity of the hot areas $4a$ so that the good heat conductivity of the reflective surfaces is used to supply the heat as it is also sensed by the cold regions at least to the close proximity of the hot ends to reduce the dissymmetries.

Balancing surfaces 8 serving, for example, the intentional supply or removal of heat for compensation purposes may also be provided. In FIG. 2*a*, for example, a heat-conducting layer 8 is shown which may also be disposed under the absorption layer 5*a*. In this way intentional heat flows are enabled which equalise the symmetry of the heat flows resulting form temperature gradients due to changes of the ambient temperature. The compensating layers may have a thickness of less than 10 µm. They may comprise one or more metallic materials. Their thermal conductivity may be high and preferably greater than 10, more preferably greater than 50 W/m/K.

FIG. 3 is a plan view of a further embodiment of a sensor element. The same numerals as in the previous drawings denote the same components. 1*a* denotes the inner edge of the frame 1 above which the membrane 3 stretches. It can be seen that in this embodiment the contacts corresponding to the cold contacts of FIG. 1 are disposed above the frame 1 and not above the pit enclosed by the frame 1. The embodiment according to FIG. 3 may also be modified so that all contacts are disposed above the pit.

The surface of the sensor element comprises different regions 41*a*, 41*b*, 42*a*, 42*b* which respectively cause electric signals. There are one or more first regions 41*a*, 41*b* which serve the generation of an electric output signal in accordance with the electromagnetic radiation to be detected. They may be thermopiles comprising hot and cold contacts 4*a*, 4*b*, and absorption and, if required, reflective layers 5*a*, 5*b* may be provided. The second regions 42*a*, 42*b* are insensitive or at least less sensitive for the electromagnetic radiation to be detected than the first regions. Their electric output signal, however, has a temperature variation which is quantitatively and/or regionally equal to that of the signal from the first regions 41.

The signals from the first regions are combined with the electric signals from the second regions, preferably they are combined in phase opposition, i.e., in case of voltage signals, so that the temperature variations of the signals from the first regions occur in phase opposition to those of the signals from the second regions. The temperature variations will then fully or partly cancel each other (depending of their degree of equality). The signal corresponding to the radiation and originating from the first regions is not or only fractionally compensated by the weaker or nonexistent radiation signal from the second regions so that, as an overall result, a radiation signal compensated for the temperature variation is obtained.

Preferably the first as well as the second regions respectively comprise one or more heat sensitive portions 4*a*, 4*b*, 44*a*, 44*b*. In the second regions the reduced radiation sensitivity may be obtained by disposing a plurality or all of the heat sensitive portions 44*a*, 44*b* either above the frame 1 so that they are thermally well coupled to the environment and short-circuited with respect to thermal heating due to the incident radiation or by avoiding their heating due to radiation absorption by covering them in an adequate manner, for example with a reflective layer.

Figure 3A:
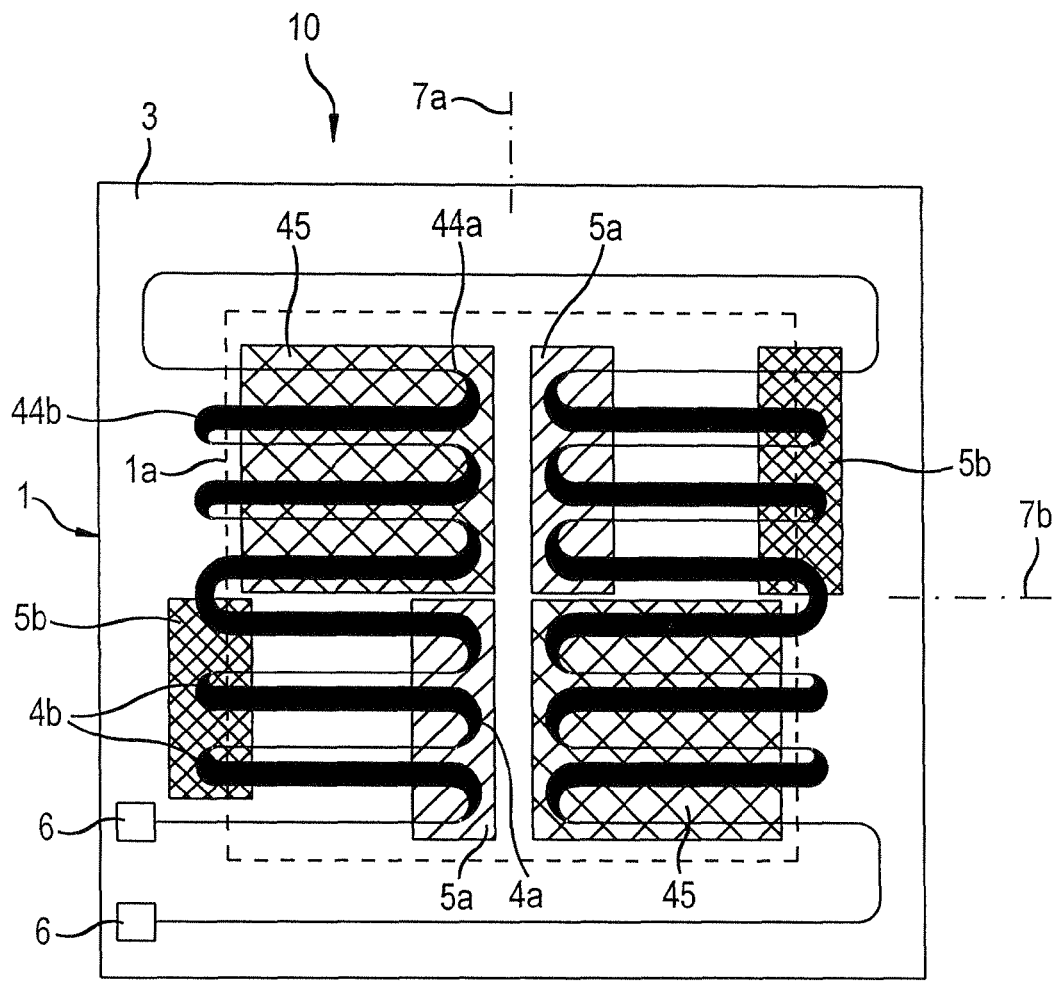
FIGS. 3A and 3B are a plan view of a further sensor element according to the invention.

FIG. 3A shows both options in combination for the second regions 42*a*, 42*b*: One part of the heat-sensitive regions 44*b* (corresponding to the material junctions usually referred to as "cold contacts") are disposed above the frame 1, and the other part of the contacts 44*b* (corresponding to the material junctions usually referred to as "hot contacts") is disposed below the cross hatched covers 45 which prevent radiation absorption, for example by being reflective. In this way it can be ensured that the radiation dependence of the output signal of the second regions is low or virtually zero. The only thing that remains is the dependence of the output signal of the second region on the ambient temperature. Said ambient temperature-dependent signal can than be switched against the output signal of the first regions which is indicated by adjoining tight marks at the junction of the meanders from the first to the second region so that the radiation-dependent signal from the first regions remains more or less uninfluenced while the ambient temperature-dependent signals from the first and second regions more or less cancel each other. As a result an output signal compensated for the temperature variation is generated at the contacts 6.

In a certain way the second regions of the present embodiment may be regarded as a temperature reference element, however including the supplementary features that the output signal is directly used for the compensation. Of course it may also be tapped via own ports and be available for other purposes.

In a preferred embodiment the first region and the second region respectively comprise one or more radiation-sensitive portions 4*a, b,* 44*a, b* which are arranged symmetrically in pairs. FIG. 3A shows arrangements symmetrical in this respect. They are symmetrical with respect to the vertical axis of symmetry 7*a* as well as to the horizontal axis of symmetry 7*b*. The symmetry may include the symmetrical arrangement with respect to the frame 1 and the membrane 3 here; in FIG. 3A this is also schematically indicated. The symmetrical arrangement results in the heat-sensitive portions of the first regions as well as the second regions being subjected to changes of the ambient temperature in a virtually identical manner so that they also provide virtually identical temperature variations. The symmetry of the arrangement therefore serves the establishment of the symmetry of the temperature variations of the signals from the first and second regions.

In the first regions 41*a*, 41*b* of FIG. 3A the cold and hot contacts 4*b*, 4*a* are covered by reflective surfaces 5*b* or absorption surfaces 5*a* in the manner described above. The reflective surfaces 5*b* may be omitted if the cold contacts 4*b* are disposed above the frame since then the cold contacts are virtually short-circuited to the thermal mass of the environment. When the cold contacts of the radiation-sensitive portions of the first regions are situated above the pit the cold contacts 44*b* in the second regions may also be arranged above the pit for reasons of symmetry. They should then be covered by the cover 45 to prevent heating due to radiation absorption and therefore a radiation-dependent output signal from the second regions.

Figure 3B:
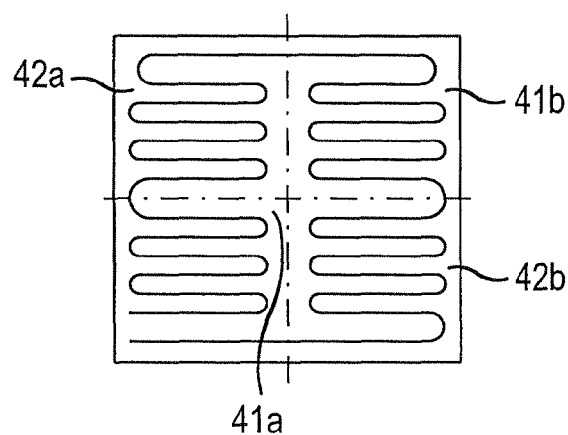

FIGS. 3A and 3B respectively show two first and two second regions. According to the application, however, for example only one first and one second region may be provided.

The heat-sensitive portions 4*a, b,* 44*a, b* may be contact points of different suitable conducting or semiconductor materials as indicated by cannels arranged on top of each other in FIG. 1 and by thick or thin lines in FIG. 3. The two materials may, for example, be Al and poly-Si. They may form thermopiles, particularly in connection with absorption and reflective layers and different couplings to or isolations from thermal masses or sinks. In one-element sensors as well as in multiple-element sensors more complex circuits may be provided for multiplexing, possibly signal and impedance conversion or the like, if required. In general correspondingly more enhanced components (not shown) may be provided in the sensor housing such as analogue/digital converters for digital signal handling and output and/or memories, particularly for measurement values, intermediate results and/or previously determined, stored correction data for one or more sensor elements to be transmitted to the outside and to be used there and/or a signal generation or calibration circuit preferably adjustable via the ports, e.g. for linearization and/or impedance conversion and/or amplification and/or a signal processor for signal processing (e.g. ambient temperature compensation, pattern recognition in case of spatial resolution) and/or parallel/serial conversion particularly in multiple element sensors and/or signal generation and/or signal processing and/or signal output for the reference element 37 and/or a data interface from and to the outside, particularly a digital, e.g. an I²C interface and/or a suitable number of ports.

The sensor may correspond to a standardised housing, e.g. a TO5 housing, with respect to its outer dimensions.

The invention claimed is:

1. A sensor element for detecting electromagnetic radiation in the infrared range, comprising
   one or more heat-sensitive portions disposed on a substrate, the substrate comprising a frame and a membrane disposed above an orifice of the frame, the orifice of the frame having a shape which has an axis of symmetry or point of symmetry, and
   one or more influencing layers for influencing the absorption and/or reflection of the electromagnetic radiation to be detected, the one or more influencing layers having asymmetric thermal properties relative to said axis or point of symmetry,
   wherein the one or more heat-sensitive portions comprise hot and cold contacts both disposed on the membrane above the orifice of the frame wherein the influencing layers cause asymmetric heat conduction between the frame and the hot and cold junctions, and
   the hot contacts are disposed asymmetrically compared to the cold contacts with respect to said axis or point of symmetry of the orifice of the frame the asymmetric heat conduction caused by the influencing layers is balanced by said hot and cold contacts asymmetry.

2. The sensor element of claim 1, wherein the one or more influencing layers comprise an absorption layer provided above one or more hot contacts and/or a reflective layer provided above one or more cold contacts, the arrangement of the heat-sensitive portions being related to heat capacity and/or heat conductivity and/or emissivity of one or more of the influencing layers.

3. The sensor element of claim 1, wherein the heat-sensitive portions are arranged on isotherms which occur during operation of the sensor element or during simulation thereof.

4. The sensor element of claim 1, wherein the arrangement of the heat-sensitive portions is related to heat capacity and/or heat conductivity and/or radiating capacity and/or absorbency and/or reflectivity of one or more of the influencing layers.

5. The sensor element of claim 1, wherein the heat-sensitive portions are disposed on an isotherm occurring during temperature compensation processes of operation of the sensor element or during simulation thereof.

* * * * *